G. B. REED.
AUTOMOBILE LOCK.
APPLICATION FILED MAR. 9, 1917.
1,244,893.
Patented Oct. 30, 1917.
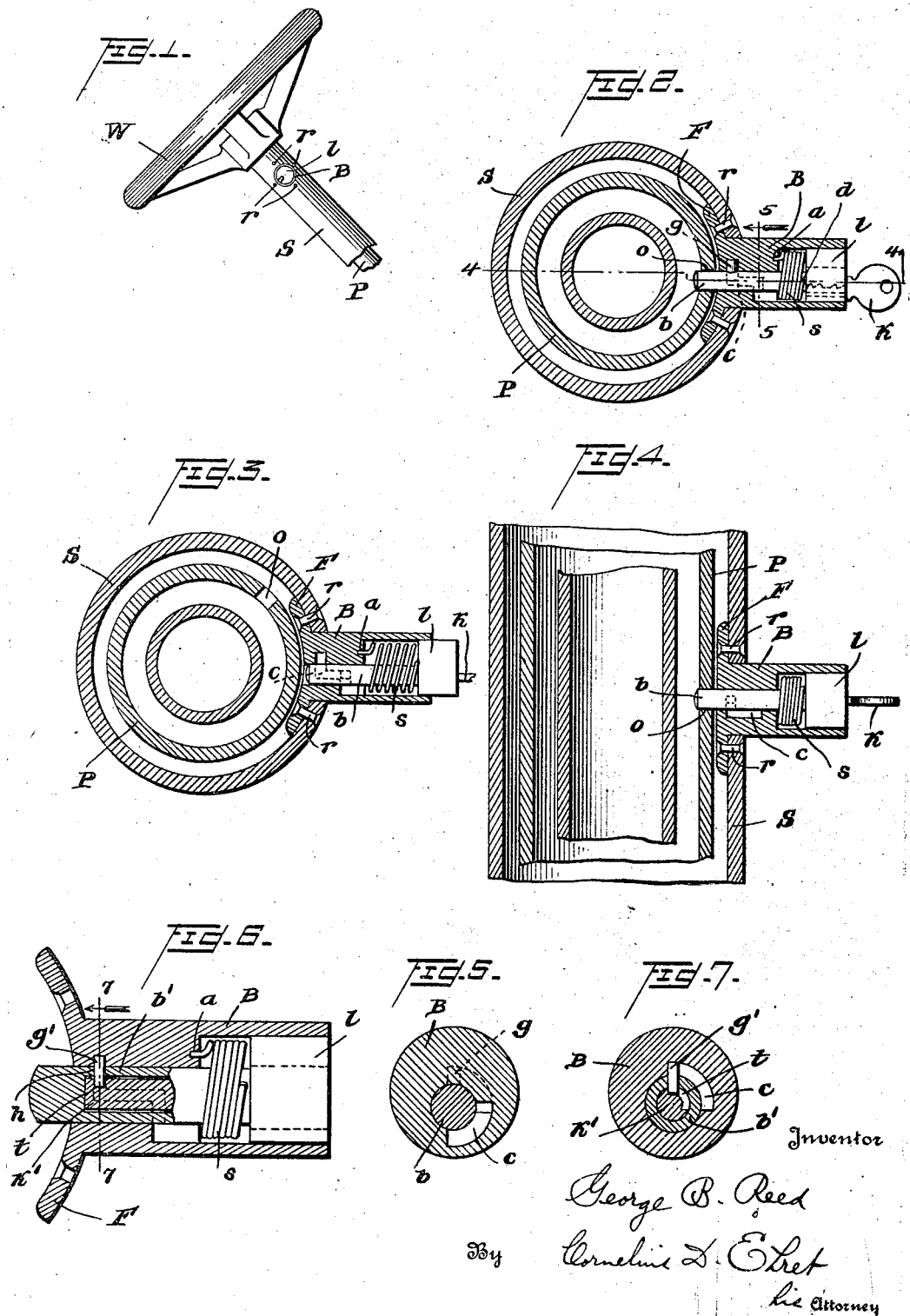
Inventor
George B. Reed
By Cornelius D. Ehret
his Attorney

UNITED STATES PATENT OFFICE.

GEORGE B. REED, OF PHILADELPHIA, PENNSYLVANIA.

AUTOMOBILE-LOCK.

1,244,893.   Specification of Letters Patent.   Patented Oct. 30, 1917.

Application filed March 9, 1917.  Serial No. 153,703.

*To all whom it may concern:*

Be it known that I, GEORGE B. REED, a citizen of the United States, residing in Philadelphia, county of Philadelphia, and State of Pennsylvania, have invented new and useful Improvements in Automobile-Locks, of which the following is a specification.

It is the object of my invention to provide a lock attachment for the steering column of an automobile or other vehicle to prevent unauthorized use of the vehicle, or for other purpose, which lock shall be of simple construction, durable, and reliable in use.

It is a further object of my invention to provide a lock attachment of the kind described, which it will be impossible to remove without disassembling the parts of the steering column.

A further object of my invention is to provide a lock attachment of the kind described which shall not be damaged by an attempt to operate the steering wheel when the steering post is locked.

To these ends I provide a lock attachment of the characteristics herein described.

For an illustration of one of the forms my invention may take, reference is to be had to the accompanying drawing, in which:

Figure 1 is a side elevational view of the upper portion of a steering column provided with my invention.

Fig. 2 is a cross sectional view, on enlarged scale, of the steering column and attached lock, showing the parts in locked position.

Fig. 3 is a cross sectional view similar to that of Fig. 2, but with the parts in unlocked position.

Fig. 4 is a longitudinal sectional view of the steering column and attached lock taken on the line 4—4 of Fig. 2.

Fig. 5 is a cross sectional view, on enlarged scale, of the lock taken on the line 5—5 of Fig. 2, as viewed in the direction of the arrow.

Fig. 6 is a longitudinal sectional view, on enlarged scale, of a modified form of my lock attachment.

Fig. 7 is a cross sectional view taken on the line 7—7 of Fig. 6, viewed in the direction of the arrow.

My improved locking attachment is fastened to the outer or stationary post S of the steering column of an automobile or other vehicle, preferably immediately below the steering wheel W, as shown in Fig. 1. The lock may, however, be attached to any portion of the post S. If the lock is to be attached to a steering column the outer post of which is free to turn, it is only necessary to pin the post to that part of the automobile body into which or through which the post passes to render the same stationary.

The lock comprises a body portion B, preferably cylindrical in form, and preferably of case hardened forged steel, having an inner flanged end F of proper shape to conform to that of the inner wall of the outer stationary post S of the steering column and to leave a small clearance space between the flange and the movable steering post P, as shown in Figs. 2, 3 and 4. If there is not sufficient space for the flange between the outer and inner posts, the outer post may be recessed to receive the flange.

The body B of the lock attachment protrudes through an opening provided in the outer or stationary post S of the steering column, as clearly shown in Figs. 2, 3 and 4, and the flange F is riveted or otherwise fixed to the post S. Rivets $r$ are preferably employed for this purpose, although bolts or screws or equivalent fastening means may be used, or the flange may be welded to the post.

The right hand portion of the body of the lock as viewed in Fig. 2 is bored or otherwise recessed to receive the barrel $l$ of a lock of any known type, such as a tumbler lock. Also, within this recess is a spiral spring $s$, one end of which engages in a recess in the body B at the point designated at $a$, and the other end of which is fast to the bolt $b$ at $d$.

The lock attachment body B is further provided with a longitudinal eccentric boring to receive the bolt $b$. The outer or right hand end of the bolt $b$ is held rigidly in the barrel $l$ of the lock when the parts are in the locked position, but may be rotated therein, but not removed therefrom, by means of the removable key $k$. The bolt $b$ carries a lug $g$, Figs. 2 and 5, the outer end of which works in a channel $c$ in the body B. This channel $c$ will be seen to have four parts, two of which are parallel to the bolt channel, and two of which lie circumferentially thereof. To remove the bolt $b$ from the locked position shown in Figs. 2 and 5 to the unlocked position shown in Fig. 3, it is necessary for the bolt first to receive a quarter turn in a clockwise direction, as viewed in Fig. 5. This causes the lug g to traverse the inner circumferential section of the channel c and to reach the intermediate longitudinal section, which permits the bolt to move to the right, as viewed in Figs. 2 and 3, a sufficient distance for its removal from the opening o in the post P.

If it is desired to entirely remove the barrel l of the lock, together with the bolt b, from the casing or body of the lock attachment, a further quarter turn of the bolt in a clockwise direction as viewed in Fig. 5 will cause the lug g to reach the outer longitudinal section of the channel c, which communicates with the outer recess, which contains the lock barrel.

When the parts are in the position shown in Fig. 2, the spring s is compressed and is also under stress in a direction such that it tends to rotate the bolt b in a counter-clockwise direction as viewed in Fig. 5, which holds the pin firmly against the innermost end of the channel c.

The modification shown in Figs. 6 and 7 is similar to that already described, the difference being in the provision of a bolt b' which is bored or otherwise recessed to receive the member k', which enters the lock barrel l and is rotatable therein in the same manner as the bolt itself in the modification of Figs. 2 to 5. Relative longitudinal movement between the bolt b' and the member k' is prevented by the pin g' which also performs the function of the lug g of Figs. 1 to 5. This pin is preferably held tightly in an opening h in the bolt b', the lower end extending into a slot t, Fig. 7, in the member k' of such length that the member k' may be rotated a quarter revolution or more in the bolt b'.

The operation of my locking attachment will be readily understood from the above description. The operation of the modification of Figs. 2 to 5 will first be described. When the steering column is not in use, the parts are in the position shown in Fig. 2 and locked, the key being removed. If it is desired to unlock the steering post to allow movement of the steering post, it is only necessary to insert the key k in the lock and to give it a quarter turn in the clockwise direction, as viewed in Fig. 5. This will give the bolt b a quarter turn in the same direction and will cause the lug g to traverse the innermost section of the channel c and to reach the intermediate longitudinal section of this channel. The spring s, being under compression, will now force the bolt and barrel to the right, as viewed in Figs. 2 and 3, and into the position shown in Fig. 3. Further movement in this direction by the spring s is prevented by the lug g, which has now reached the end of the intermediate section of the channel c. The spring s continues to exert a torque upon the bolt b in a counterclockwise direction, so that the lug has no tendency to traverse the intermediate circumferential section of the channel c. The steering post is now free to turn.

The lock l of Figs. 2 to 5 may be of the type in which the key may now be removed, the parts being in the position shown in Fig. 3. Or, if desired, the lock may be of the type in which the key may be inserted or removed only when the parts are in the position shown in Fig. 2. This has the advantage that the key is always in place in the lock ready for use, when the parts are in the unlocked position.

If it is desired to inspect or clean the parts, the lock barrel l and the bolt b may be removed from the body or casing B by turning the key another quarter revolution, the parts being in the position shown in Fig. 3. This will cause the lug g to traverse the intermediate circumferential section of the channel c and to reach the outermost longitudinal portion of this channel, which it will then traverse due to the action of the spring s, which is still under compression. This enables the barrel l, bolt b and spring s to be removed.

The parts may be locked, that is, changed from the position shown in Fig. 3 to that of Fig. 2, without the use of a key. By pushing the lock barrel l inwardly or to the left, as viewed in Fig. 3, the movable parts will be forced toward the movable post P of the steering column until the end of the bolt b strikes the post. The steering wheel is then turned until the bolt b enters the opening o. It will be remembered that the spring s, in the position shown in Fig. 3, exerts a torque upon the bolt b in the counter-clockwise direction, as viewed in Fig. 5. When the lug g reaches the inner circumferential section of the channel c, the bolt b is free to turn and will do so due to the torque exerted by the spring s. This motion will cease when the lug g reaches the innermost end of the channel c.

The operation of the modification shown in Figs. 6 and 7 is the same as that already described, and, in addition, the lost motion connection between the bolt b' and the member h permits the use of a lock l of the type in which the key may be inserted or removed in one position only of the lock barrel. With the parts in the position shown in Figs. 6 and 7, i. e., the locking position, the lock barrel is in a position to receive the key. A quarter turn of the key will release the bolt, which will then take the unlocked position in the manner already described. The slot t will then permit the key to turn the member k' back to its original position, when the key may be removed.

As in the modification first described, the attachment may be locked without the use of a key, it merely being necessary to push the lock member $l$ inwardly.

In the locks of the prior art there are present no adequate means to prevent unauthorized removal from the steering column. I provide structure by which the removal of the lock attachment without disassembling the parts of the steering column is positively prevented. Even if the rivets which hold the flange to the post are driven out, the lock attachment cannot be removed. For this reason screws or other fastening means removable from the outside of the post may be employed in place of rivets. There is an absence of all projecting parts which could be easily injured or removed. My improved lock, even if struck a severe blow, would not ordinarily be broken, but would merely be loosened by the failure of the rivets to hold the flange to the post.

It will be noted also that the bolt $b$ has a long bearing in the body B of the lock attachment, and that the clearance space between the flange F and the movable post P is small. This prevents the bolt being broken or displaced with respect to the other parts of the lock attachment by an attempt to turn the steering wheel when the parts are locked.

The relative dimensions of the parts, as well as their shape, may, of course, be modified if desired. It may, under certain conditions, be found advantageous to materially increase the diameter of the body B or to give it a frustoconical shape with the smaller diameter at the outer end.

My invention is not limited in its use to the steering column of a vehicle, but may be employed wherever there is an outer tubular element in which is a second element, the two being designed for relative movement, it being desired to lock the elements at times against such movement.

It will be understood that many changes may be made in the structure shown and described without departing from the spirit of my invention, as defined in the following claims.

What I claim is:

1. In a lock attachment for relatively movable elements, one of which is tubular and the other of which is designed for movement in said tubular element, an opening in said tubular element, a body portion secured to said tubular element at said opening, a recess in the outer end of said body portion, a lock fitting said recess and longitudinally movable therein, a longitudinal opening in said body portion eccentric with said recess in the outer end of said body portion, a bolt movable longitudinally in said longitudinal opening and rotatably connected with said lock and adapted to engage the inner relatively movable element which it is desired to lock.

2. In a lock attachment for relatively movable elements, one of which is tubular and the other of which is designed for movement in said tubular element, an opening in said tubular element, a body portion attached to said tubular element at said opening, a bolt movable in said body portion and adapted to engage the inner relatively movable element which it is desired to lock, a recess in the outer end of said body portion, a lock in said recess, said bolt entering said lock and being held rotatably therein, a lug on said bolt engaging in a channel in said body portion, and a spring exerting a force outwardly upon said lock and a torque upon said bolt.

3. In a locking attachment for automobiles and the like, the combination with an outer fixed post and an inner movable post of a steering column, of an opening in said outer post, a body portion attached to said post at said opening, a bolt longitudinally movable in said body portion and adapted to engage and lock said movable post, means preventing longitudinal movement of said bolt in its locking position except after rotative movement, means preventing rotative movement of said bolt comprising a lock rigidly connected thereto and non-rotatably engaging said body portion, and means for changing said rigid connection to one permitting rotation of said bolt with respect to said lock, whereby the bolt and lock may be moved to unlocking position.

4. In a locking attachment for automobiles and the like, the combination with an outer fixed post and an inner movable post of a steering column, of an opening in said outer post, a body portion attached to said fixed post at said opening, a bolt longitudinally movable in said body portion and adapted to engage and lock said movable post, means preventing longitudinal movement of said bolt when in its locking position except after rotative movement thereof, means preventing rotative movement of said bolt comprising a lock rigidly connected thereto and non-rotatably engaging said body portion, a key for said lock for changing said rigid connection to one permitting rotation of said bolt, whereby the bolt and lock may be moved to unlocking position, and a lost motion connection between said lock and said bolt.

5. In a locking attachment for automobiles and the like, the combination with a tubular member, of a second member within said tubular member and movable with respect thereto, said members spaced from each other, and means for locking said members against relative movement comprising a body member extending through an opening in said tubular member to the exterior thereof, a flange integral with said body member disposed in the space between said first named members, means securing said flange to said tubular member independently of that part of said body member projecting outside of said tubular member, a bolt rotatable and movable longitudinally within said body member, and a key controlled lock controlling said bolt, said bolt and said lock housed within said body member.

6. In a locking attachment for automobiles and the like, the combination with a tubular member, of a second member within said tubular member and movable with respect thereto, and means for locking said members against relative movement comprising a body member secured to said tubular member, a bolt rotatable and movable longitudinally in said body member, a key controlled lock controlling said bolt and movable longitudinally therewith, and a spring opposing rotation of said bolt when in locking position and opposing longitudinal movement of said bolt toward locking position.

In testimony whereof I have hereunto affixed by signature this 7" day of March, 1917.

GEORGE B. REED.